US008100763B2

(12) United States Patent
Collette et al.

(10) Patent No.: US 8,100,763 B2
(45) Date of Patent: Jan. 24, 2012

(54) GAMING METHOD AND SYSTEM WITH AVERAGE BET BONUS ENHANCEMENT

(75) Inventors: Shawn Colin Collette, Moncton (CA); Todd Edward Grimm, Riverview (CA)

(73) Assignee: Spielo Manufacturing ULC, Moncton, New Brunswick (CA)

( * ) Notice: Subject to any disclaimer, the term of this patent is extended or adjusted under 35 U.S.C. 154(b) by 687 days.

(21) Appl. No.: 11/979,974

(22) Filed: Nov. 9, 2007

(65) Prior Publication Data

US 2009/0124353 A1 May 14, 2009

(51) Int. Cl.
*G06F 17/00* (2006.01)

(52) U.S. Cl. .......................................................... 463/25

(58) Field of Classification Search ............... 463/16–29
See application file for complete search history.

(56) References Cited

U.S. PATENT DOCUMENTS

| | | | | |
|---|---|---|---|---|
| 6,960,134 | B2 * | 11/2005 | Hartl et al. | 463/20 |
| 7,192,343 | B2 * | 3/2007 | Vancura | 463/15 |
| 2005/0059476 | A1 * | 3/2005 | Vancura | 463/20 |
| 2007/0060299 | A1 * | 3/2007 | Nelson et al. | 463/20 |
| 2007/0060377 | A1 * | 3/2007 | Nelson et al. | 463/42 |
| 2009/0042641 | A1 | 2/2009 | Anderson et al. | |
| 2009/0111566 | A1 * | 4/2009 | Naicker et al. | 463/20 |

* cited by examiner

*Primary Examiner* — Ronald Laneau
(74) *Attorney, Agent, or Firm* — Sullivan & Worcester LLP; Christopher T. McWhinney

(57) ABSTRACT

A method and system for facilitating the play of a wagering game with a bonus game. Examples include keeping track of a number, which is increased based on wagers and optionally decreased based on other criteria providing a measure dependent on a player's average wager during play sessions. Examples provide a regular or base wagering game, provide a bonus play trigger, and when triggered, provide a bonus round with bonus play prize. Examples further provide a bonus play prize enhancement based on the value of the number maintained by the invention.

24 Claims, 12 Drawing Sheets

Fig. 7A
610'
620'
630'
IS WILD AND DOUBLE LINE WINS
2x
3x
GAME OVER
250
CREDITS
50¢
250
BET
PAYS/
INFO
0
WIN
Credit bank
710
Current wager
720
Prize
730
Pay line
indicators
735
Pay line
indicators
735

FIG. 7B
3 OR MORE START FREE GAMES
2x
3x
Bonus round trigger 750
Bonus round trigger 750
Bonus round trigger 750
BONUS FEATURE TRIGGERED
0
CREDITS
50¢
250
BET
PAYS/ INFO
1,250
WIN
Message bar 740

FIG. 7D
Indication of bonus
round multiplier
FREE GAME 12 OF 15
2X
GAME PAYS 1,000
0
CREDITS
50¢
250
BET
PAYS
INFO
9,800
WIN

FIG. 7E
FREE GAME 15 OF 15
CONGRATULATIONS
YOU WIN
6800
CREDITS
8,775
CREDITS
50¢
250
BET
PAYS/
INFO
6,800
WIN

GAMING METHOD AND SYSTEM WITH AVERAGE BET BONUS ENHANCEMENT

BACKGROUND INFORMATION

Video gaming machines such as slot machines or video poker have long been a staple for the gaming industry. The profitability of a machine for operators is directly related to how popular that machine is to players. Competition for a more popular design among manufacturers is high, and a more popular game provides a substantial marketplace advantage. Popularity of a machine is often a function of both the perceived likelihood of winning and the entertainment value of the game itself.

One method of increasing both entertainment value and perceived likelihood of winning is the prevalent use of a bonus round. These designs allow a player to win a free game, either the same as the base game or a different game. Often times game establishments are limited in the number of machines they are able to provide; either due to floor space limitations or government regulation. For this reason it is important to maximize the profitability of each individual machine. For example, one player on one machine betting a dollar per play is as profitable as twenty players on twenty machines betting a nickel per play.

SUMMARY

One example embodiment of the present invention is a computer-implemented method for facilitating the play of a wagering game with a bonus game. The method maintains a register, and receives at least one wager from a player during a regular game session. The method increases the value of the register in response to a wager, and provides a regular play. The method provides a bonus trigger, and a bonus play if the trigger is triggered. As part of the bonus play, the method awards a bonus prize, the value of which depends at least in part on the value of the register.

Optionally, in the method, the amount the register is increased after each regular play may depend on the amount wagered during that regular play.

Optionally, the method may decrease the value of the register at the end of each regular play.

Optionally, the example may decrease the value of the register at the end of each regular play by an amount which depends at least in part on the current value of the register.

Optionally, the example method may determine the value of the bonus play prize by multiplying a base value by a multiplier which depends on the current value of the register.

Optionally, the example method may display the multiplier to the player during a regular play session.

Optionally, the example method may provide, as part of the bonus play, a number of additional bonus play rounds, where the number depends on the current value of the register.

Optionally, the example method may display the number of additional bonus play rounds to the player during the regular play session.

Optionally, the example method may display to the player a visual indication of the total wager amount needed to increase the value of the additional bonus play prize that will be awarded if the bonus play is triggered.

Optionally, the example method may decrease the register value at the end of bonus play.

Any of the above example methods may be encoded in a computer readable storage medium, configured to be executed by a processor, where the execution of the instructions cause the performance of any of the methods described above.

Another example embodiment of the present invention is a system that includes a display, a processor in communication with the display, and is configured to cause the display to display a regular play session for a wagering game. The system also includes a register accessible to the processor, and an input device configured to receive a wager from a player. The processor is configured to receive information from the input device indicating the wager amount, and is configured to increase the value of the register based on the wager amount. The processor is also configured to cause the display to display a bonus trigger during a regular play, and a bonus play if the trigger is triggered. The processor is further configured to award a bonus play prize as part of the bonus play, where the value of the bonus play prize is based at least in part on the value of the register.

Optionally, in the example system, the processor may be configured to decrease the register value responsive to each regular play.

Optionally, in the example system, the processor may be configured to decrease the register value responsive to each bonus play.

Optionally, in the example system, the processor may be configured to decrease the register value an amount which depends on the current register value.

Optionally, in the example system, the processor may be configured to determine the additional bonus play prize by multiplying the first bonus play prize by a multiplier whose value depends on the value of the register.

Optionally, in the example system, the processor may cause the display to display the current value of the bonus play prize multiplier during a regular play session.

Optionally, in the example system, the processor may be configured to provide additional bonus play rounds as the additional bonus play prize, where the number of additional bonus rounds depends on the value of the register.

Optionally, in the example system, the processor may be configured to cause the display to display during a regular play, the number of additional bonus play rounds that would be provided if a bonus play were triggered.

Optionally, in the example system, the processor may be configured to cause the display to display a visual indication during a regular play of the total wager amount needed to increase the value of the additional bonus play prize that will be awarded if the bonus play were triggered.

Another example embodiment of the present invention is a computer-implemented method of facilitating the play of a wagering game with a bonus game. The method includes maintaining a register, receiving a wager from a player during a regular play session, and in response to receiving the wager, increasing the value of the register. The method will then provide a regular play, a bonus play trigger during the regular play, and responsive to the occurrence of the bonus play trigger, provide a bonus play. As part of the bonus play, the method will present a selection range for a bonus play prize to the player, the maximum amount of the selection range depending on a current value of the register, and the method will receive from the player an indication of the player's selection of a bonus play prize amount chosen from the selection range. The method will then decrement the register based on the indication received from the player, and responsive to a win occurring in the bonus play, awarding the bonus play prize that is based at least in part on the indication received from the player.

Optionally, the example method may link one or more devices which implement the method to a server. An example method using a server may allow a player to access the player's associated register from any linked device.

Optionally, the example method may decrease the register based on the amount of an additional bonus play prize the player receives.

Any of the above example methods may be encoded in a computer readable storage medium, configured to be executed by a processor, where the execution of the instructions cause the performance of any of the methods described above.

DETAILED DESCRIPTION OF EXAMPLE EMBODIMENTS

Applicant has observed that the high entertainment and excitement effect of bonus round machines provides a continuing need to improve upon those designs and enhance the basic bonus round design. Some of the example embodiments described below illustrate an approach to reward a player making larger bets, and encourage players in general to make larger bets during a wagering game. Some examples embodiments of the present invention include systems and methods for providing a bonus round with bonus prize, where the bonus prize is determined in part by the average wager of the player. Two examples include a bonus prize multiplier or additional bonus round spins. During regular play a player may "earn" higher potential bonus round prizes (e.g. a high multiplier or a more spins) based on the average wager of the player. If a bonus round is triggered, the player may receive that higher prize. A more detailed description of example embodiments follows.

This section describes the figures and example embodiments in greater detail. Figures are numbered and the elements of figures all begin with the figure number followed by the element number. For example, element 10 of FIG. 1 will be labeled 110.

Figure 1A:
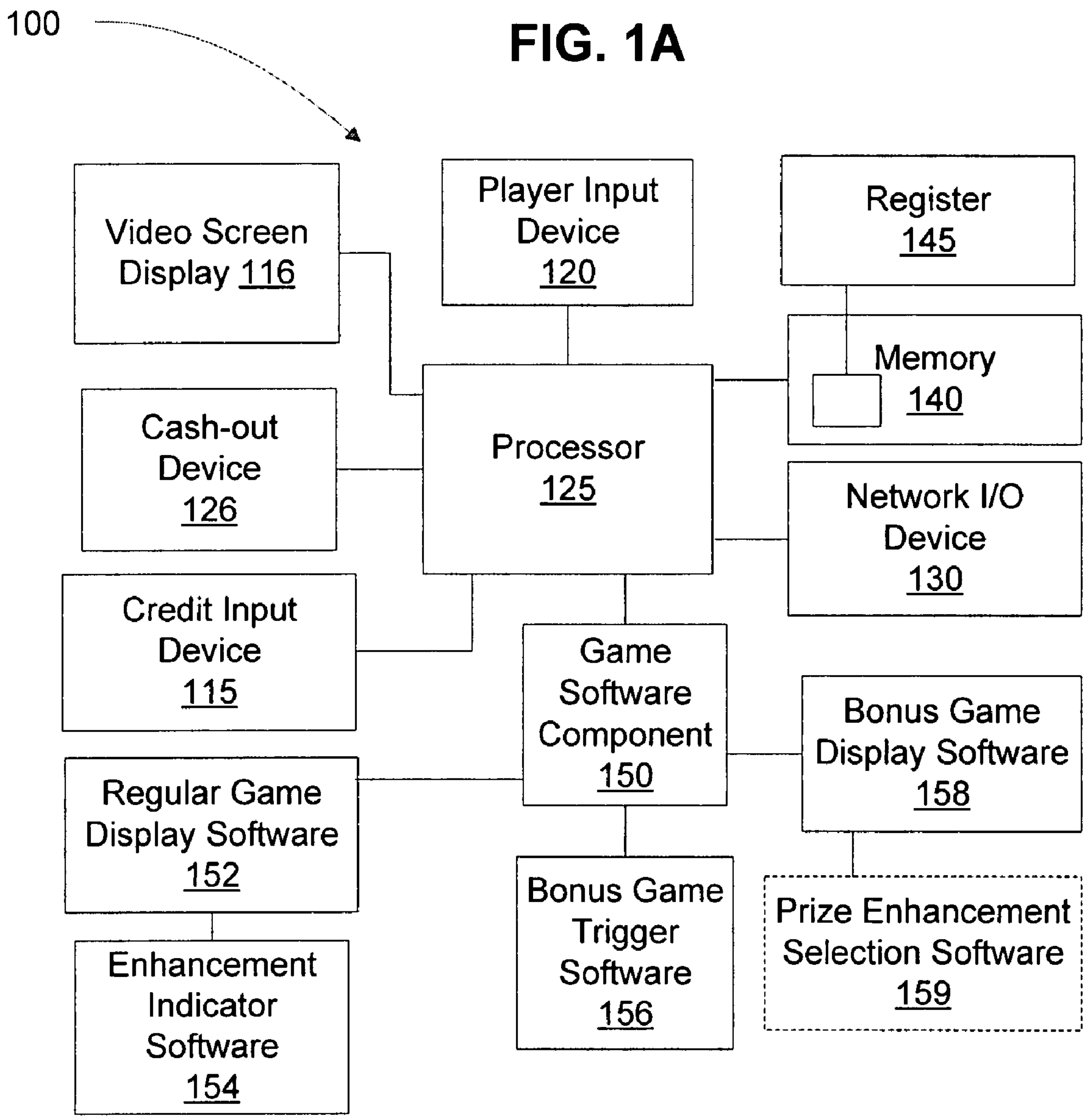
FIG. 1A illustrates a block diagram of an example gaming terminal, according to an example embodiment of the present invention.

FIG. 1A illustrates a block diagram of an example gaming terminal 100, according to an example embodiment of the present invention. The gaming terminal 100 may include a video screen display 116. The video screen display may display the game graphics and may have variable control settings. The video screen display may also have, for example, touch-screen buttons for player input. The gaming terminal 100 may also include a player input device 120. The player input device 120 may be any device which allows the gaming terminal 100 to accept input from the user, for example, a conventional keyboard, an external number keypad, a joystick, a mouse, or the video display itself may accept touch-screen input. The gaming terminal 100 may also include a credit input device 115. The credit input device 115 may be designed, for example, to accept paper bills, or other slips detailing credit, or may be a device which reads magnetically or electronically stored information. Terminal 100 may also include a processor 125. The processor 125 may be, for example, a CPU or microprocessor. The terminal 100 may also include a network I/O device 130. The network I/O device 130 may be, for example, a serial port which may connect to a telephone line. The game terminal 100 may also include memory 140 to store the various graphics and instructions required to operate video screen display 116. Memory 140 may also allocate space for a register 145 to keep track of some value or set of values during game play. Alternatively, register 145 may be a separate piece of hardware, independent of the main set of memory 140.

The example gaming terminal 100 may also include a game software component 150. The game software component may contain instructions for executing the game methods described below. The game software component 150 may be stored in memory 140, a server, a disk, or any other device capable of being accessed by processor 125. The game software component 150 may have software to display a regular game 152. The regular game display software may have software to display an enhancement indicator 154 (e.g. the example of FIG. 6). The game software component 150 may have bonus game triggering software 156. The game software component 150 may have bonus game display software 158, which may be executed responsive to the bonus trigger 156. The bonus game display software 158 may have an optional software component which may be used to allow the player to select the level and/or nature of the bonus prize enhancement. It should be appreciated that any of these software components 150-159 may be directly accessible by the processor 125, accessible remotely through the network I/O device 130, accessible through the memory 140 (as being stored in memory 140), or through any other device capable of being accessed by the processor 125 (e.g. a disk and disk-drive). The software components 152-159 may be part of the game software component 150, or may be independent components accessible by processor 125.

Figure 1B:
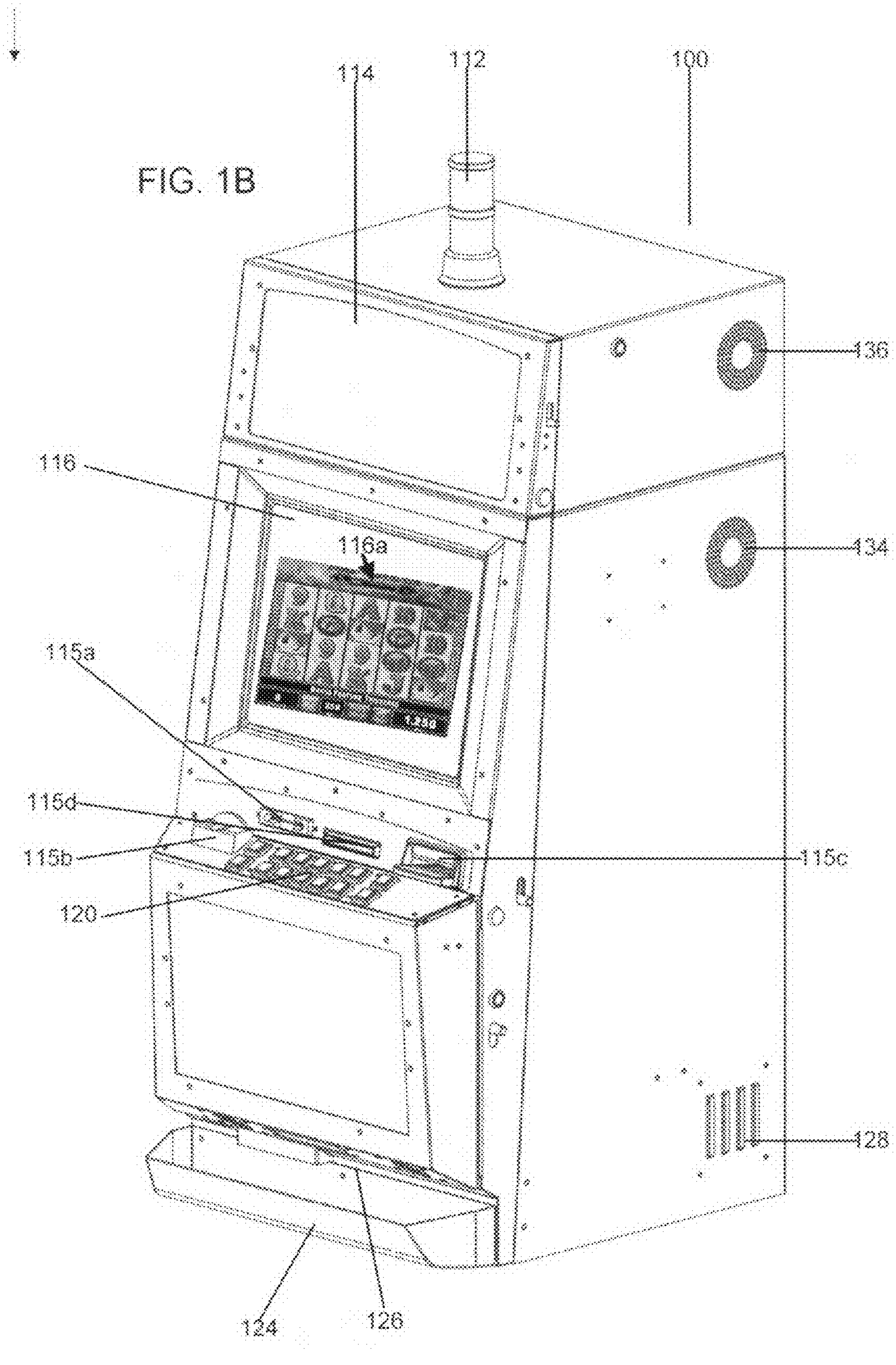
FIG. 1B further illustrates an example gaming terminal, according to an example embodiment of the present invention.

FIG. 1B further illustrates an example terminal 100, in accordance with an example embodiment of the present invention. A terminal 100 may be configured to conduct a wagering game. For example, a wagering game may be a slot machine game, a lottery, a video game, or another game of chance involving a wager. For example, the terminal 100 may be a video poker game terminal, a video wagering game terminal, a video slot machine, or a video game terminal. The terminal 100 may be in communication with a server. Though a video terminal has been illustrated, other embodiments such as a fixed slot machine with actual reels could be used. Alternatively, a computer over a network (e.g. the internet) or standing alone could be used.

The terminal 100 may include a blinker 112. The blinker 112 may enclose a light configured to blink on and off. For example, the blinker 112 may be configured to blink when a large prize is awarded from the terminal 100.

The terminal 100 may include a lighted display 114. For example, the lighted display 114 may include a logo, a game name or other visually attractive graphics. The lighted display 114 may alternatively be a liquid crystal display screen or any other visual display device.

The terminal 100 may include display screen 116. The display screen 116 may be a liquid crystal display screen (LCD), a cathode ray tube (CRT) screen, a plasma display, or any other visual display device. For example, the display screen 116 may enclose a viewable display area visible to a player. Alternatively, the display screen 116 may be a touch screen, able to accept player inputs of touching the screen. Display screen 116 may be configured to display an example game of an embodiment of the present invention (e.g. as illustrated in FIG. 1B, display element 116, and similarly FIGS. 7A-E). The example game may display an example enhancement indicator 116*a* (e.g. as seen in FIGS. 6, 7A-E).

The terminal 100 may include a credit card accepter 115*a*, a player's card accepter 115*d* and a currency accepter 115*c* and 115*b*. For example, the credit card accepter 115*a* may accept a credit card or a debit card for a player's wager, or to load credits into a "bank" for future wagers. For example, the player's card accepter 115*d* may accept a frequent player's card. The frequent player's card may include a player's identifying information and wager history. Alternatively, the frequent player's card may include an identifier that is associated with a player's identifying information and wager history. The player's card may be configured to store credit information, allowing a player to move the "bank" associated with the player from one terminal to another, or to the same terminal later. The currency accepter 115*c* may be configured to accept cash bills in various denominations for a player's wager (or for the "bank" to be wagered later), and 115*b* may be configured to accept cash coins in various denominations.

The terminal 100 may include input modules 120. For example, the input modules 120 may be a set of buttons. The input modules 120 may be configured to receive input from a player during a wagering game.

The terminal 100 may include a dispenser tray 124 and a dispenser 126. The dispenser 126 may be configured to dispense a prize. For example, a prize may be currency or a prize receipt redeemable at a cashier. The dispenser tray 124 may be configured to catch the prize after it is dispensed.

The terminal 100 may include openings 128, 134 and 136. Opening 128 may be configured to allow ambient air to circulate into and out of an interior of the terminal 100. Openings 134 and 136 may be configured to allow sound through.

While FIG. 1B may illustrate a dedicated electronic slot machine, the functionality of example methods or systems could also be implemented on various other devices. These devices may by stand alone or distributed. These devices may run any number of wagering games, such as a video poker game, a lottery game, or any other wagering game known in the art. Even games typically reserved as "table games" such as craps or roulette may implement the example methods or systems described here. The games may run on any number of devices, including the terminal described in FIG. 1B, a cell phone, a PDA, a computer connected to a network (e.g. the in house network of a gaming establishment or the internet), or any other device capable of implementing the methods or systems described here.

Figure 2:
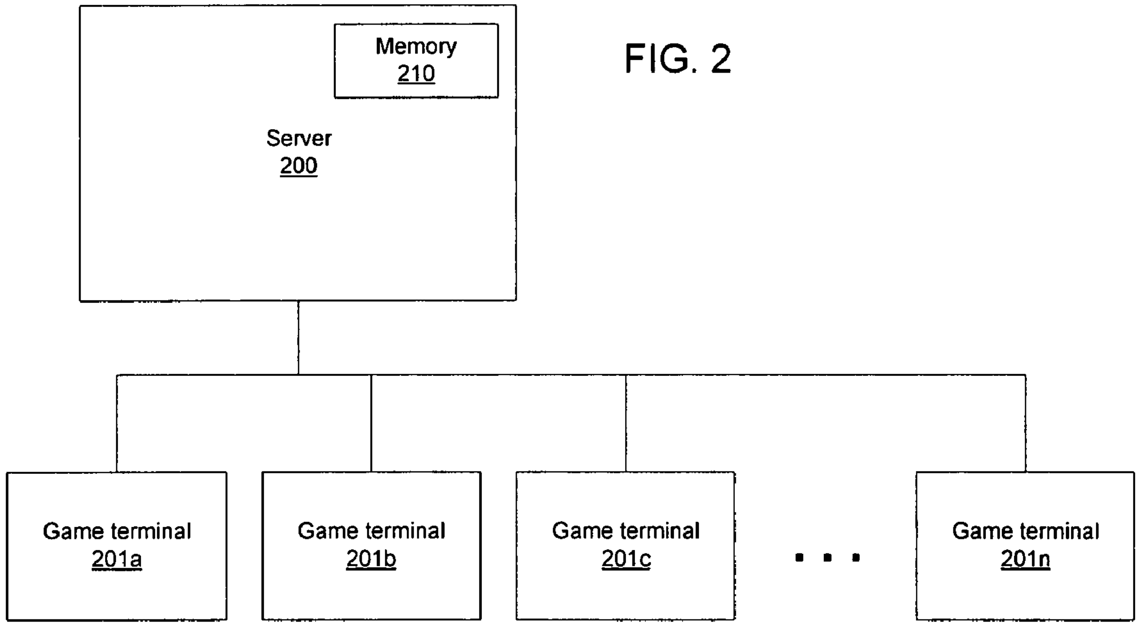
FIG. 2 illustrates an example distributed system including a plurality of distributed gaming terminals, according to an example embodiment of the present invention.

FIG. 2 illustrates an example plurality of gaming systems. Using the network I/O device 130 described in FIG. 1, each game terminal 201*a-n* may be connected to a central server 200. In this example, terminal 201 may be terminal 100 as described in FIG. 1. The gaming terminals may report certain status data, including security, exception, cash-out, and game play events, as necessary. Additionally, by connecting the terminals to a server 200 certain information may be stored in the server memory 210, and be accessed by any terminal 201. In this example embodiment player information could be accessed by the player no matter which terminal 201 the player was using at any given time. While only one server and four terminals are shown in FIG. 2, it is appreciated that this system could run on any number of network topologies, distributions, or configurations and accommodate any number of terminals 201. In another example, a central server is not even needed as the networked terminals could run a peer-to-peer topology, either simulating a central server among themselves or fully distributing the group operation. The terminals may be wired, wireless, or configured in any number of ways known in the art for implementing communication among the terminals and optional server.

Figure 3:
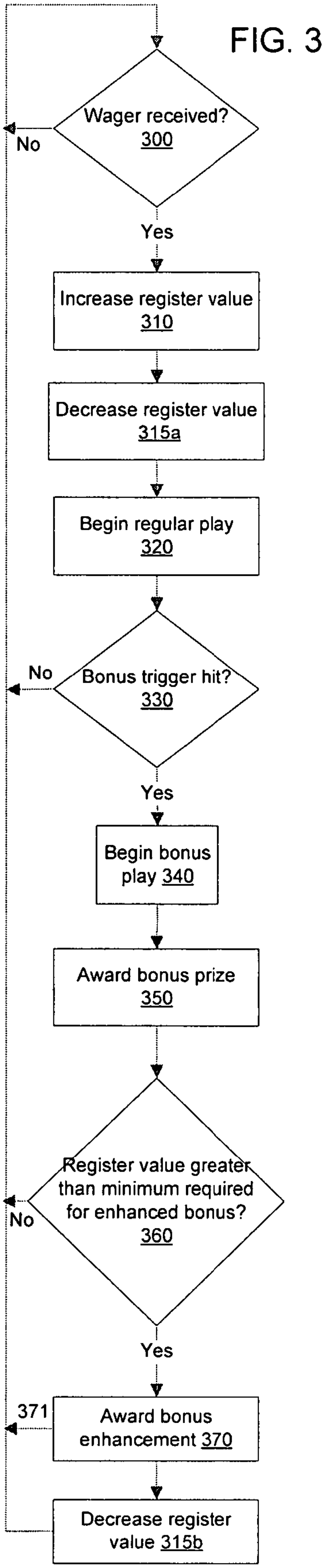
FIG. 3 illustrates an example method, according to an example embodiment of the present invention.

FIG. 3 is a flow chart illustrating an example procedure, according to an example embodiment of the present invention. The procedure waits for a player to place a wager 300. Once a wager has been placed, an amount depending on the amount wagered is added to the register 310. The register is a hardware or software means for keeping track of a number. It may be a stand alone piece of hardware, an allocation in main memory, or any number of other implementations for storing and changing a number. In one embodiment, where 100 credits are wagered the register will increase in value by 100. In other embodiments the increase will not be one-to-one or even proportional to the wagered amount. Also in other embodiments, the increase will be tied to win size (in addition to or in the alternative to wager size). The increase may be tied to total wager size or win size, or the increase may depend on how many pay lines are selected. Next the register may be decreased by a certain amount at 315*a*. In one example the amount the register decreases is based on the current value of the register. Next a regular play will begin 320. The example procedure offers both a regular or "base" game, and when triggered a "bonus" game. The "bonus" game may be the same game as the base game, a similar game, or a totally different game. In 320, the player's wager has begun the regular game. During the play of a regular game there may be a bonus round trigger, such that if the trigger is triggered a bonus game is awarded. In 330, the procedure determines if the bonus game trigger has been triggered. A "no" result of 330 would take the procedure directly back to 300. Alternatively, if, in 330, it is determined that the bonus trigger was triggered then a bonus game is played at 340. The bonus game 340 results in a bonus prize 350 (the result of the bonus game may end up being an award of zero credits, but this is still considered "a bonus prize"). Next, the procedure determines if the value of the register is greater than the minimum required to grant an enhanced bonus prize 360. If the register value is not large enough, the procedure goes back to waiting for a wager 300. However, if the register value is large enough, the procedure will award a bonus prize enhancement 370. This bonus prize could be any number of things. In one example the bonus prize enhancement may be one or more additional bonus spins. In another example, the bonus prize enhancement may be multiplying the first bonus prize by a multiplier. For example, if the register value corresponded to a multiplier value of five, and during the bonus round you won ten credits, then the bonus prize enhancement would be a multiplication of ten and five for a total bonus prize of fifty credits.

The optional decrease register 315*a* is used in another example. It could be implemented and configured in any number of ways. One configuration is to decrease the register value after every wager by a fixed number depending on the current value of the register. So for example, the register could be configured to increase at a one-to-one rate with the wager amount, and the procedure could be configured to award a bonus multiplier depending on which of a plurality of ranges the register value falls into. So for example register values 0 to 100 may correspond to a 1× multiplier (effectively no additional award) and subsequent ranges of 100 could correspond to higher multipliers (e.g. 101 to 200 corresponds to a 2× multiplier). Should the bonus trigger be hit while the register value is greater than or equal to 101 and less than or equal to 200, then any bonus round award will be doubled. In addition to increasing the register depending on the wager amount, the procedure may decrease the register during 315*a*. In one example, 315*a* will decrease the register value based on the current value of the register. So, for example, after each wager, if the register value is in the zero to one hundred range, it may be decreased by ten, and if it is in the 101 to 200 range, it may be decreased by twenty. The decreasing and the determination of how much to decrease may be done in any number of ways, but the benefit of coupling the increase to wager amounts and the decrease to something other than wager amounts is a bonus based on average betting. This configuration may encourage larger bets from the player.

For example, if the player bets 50 credits during each regular play, then the register value will increase 50 units each play and decrease 10 units in the first range, 20 units in the second range, and so on. In this example, it will be appreciated that the more the player bets the faster potential bonus prize enhancements will increase, but the rate of increase will slow as the potential awards get higher until finally the rate of decrease is equal to the rate of betting and the award increases stop. At this point, the player will be stuck at this level of potential bonus award enhancement or will need to start betting more credits per round so that the rate of register increase exceeds the rate of register decrease. In this way, the procedure rewards all players, but provides greater rewards for the player willing to wager more during a play session. The above described approach is merely one example; different rates of increase and decrease, different value ranges, and different award categories are all possible. The above example describes a progress indication measured by the arithmetic sum offset by a step-function, which creates something close to a logarithmic mean. However, this is only one example of how to award larger betting players. The average wager could be calculated in any number of ways including an arithmetic mean, median, geometric median, geometric mean, harmonic mean, quadratic mean, weighted mean, or any number of other mathematical functions used to measure the central tendency of a set of numbers. A tri-mean, normalized mean, or moving average would be other example implementations.

Another example variation is found in 315*b*. Here the register may decrease after the additional bonus award, as an alternative to 315*a* or an addition to 315*a*. An optional register decrease at 315*b* could be used as an additional register decrease similar to 315*a* (though possibly configured to decrease the register in a larger or smaller amount based on the same or different criteria as 315*a*). Alternatively, the optional decrease at 315*b* could be used to completely zero out and reset the register value after a bonus award enhancement has been issued in 370. If no decrease is made at 315*b* then 370 will go back to waiting for a wager (line 371).

FIG. 3 illustrates two optional placements of the register decrease, 315*a-b*. However, it will be appreciated that a register decrease could be placed at any point in the example procedure. For example, in one example procedure placing a wager 300 (e.g., irrevocably placing credits at risk) may be functionally inseparable from the start of the regular play 310 (e.g., starting the regular play is what locks in the wager). In that example, implementation increasing the register 310 and decreasing the register 320 may either or both be placed after the beginning of the regular play 320. Even if a wager and play are not functionally inseparable, the increase and decrease may be placed after the beginning of the regular play 320 or any other step in the procedure. Adjusting the time in the procedure where the register adjustments are made may achieve different betting incentives in different example procedures.

Figure 4A:
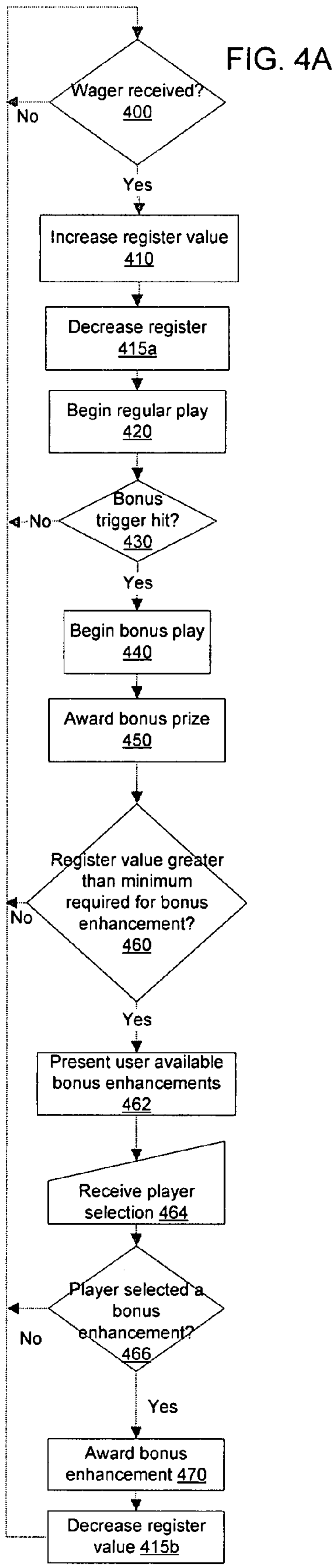
FIG. 4A illustrates a flowchart of an example method, according to another example embodiment of the present invention.

In another example procedure, illustrated by FIG. 4A, instead of automatically awarding a bonus prize enhancement, the procedure may ask the player if the player would like to "spend" some or all of their register value on applying a bonus prize enhancement to their first or base bonus prize (e.g., 450). 400-460 are essentially the same as FIG. 3. However, instead of automatically awarding a bonus enhancement based on the register value, the user will be presented with the available options in 462. Then, using the example numbers and configuration given in the description of FIG. 3, if the register value was for example 360, or any number in the fourth range, the player may be given the choice of multiplying their bonus award by 4 at a cost of 300 register value units, or multiplying their bonus award by 3 at a cost of 200 register value units, and so on. The player may then make a selection in 464. If the player selects no bonus enhancement 466, the procedure returns to waiting for the next wager. If the player selects some bonus enhancement 466, the enhanced bonus is awarded 470, and the register is decreased the appropriate amount 415*b*. The benefit of this example procedure is greater player control of the game. For example, maybe a player hit a bonus trigger but did not win very much during the bonus play. In this example, they may want to spend some register value on an additional bonus award, in case they do not hit another bonus round trigger, but save some because they expect to hit it again and win a better base bonus prize which, of course, will increase the effective worth of the multiplier. This is just one example; many more examples and configurations are possible. For example, instead of a multiplier, the additional bonus may be additional bonus round spins. The player could then select how many additional bonus round spins the player would like to use in 462 to 470.

Figure 4B:
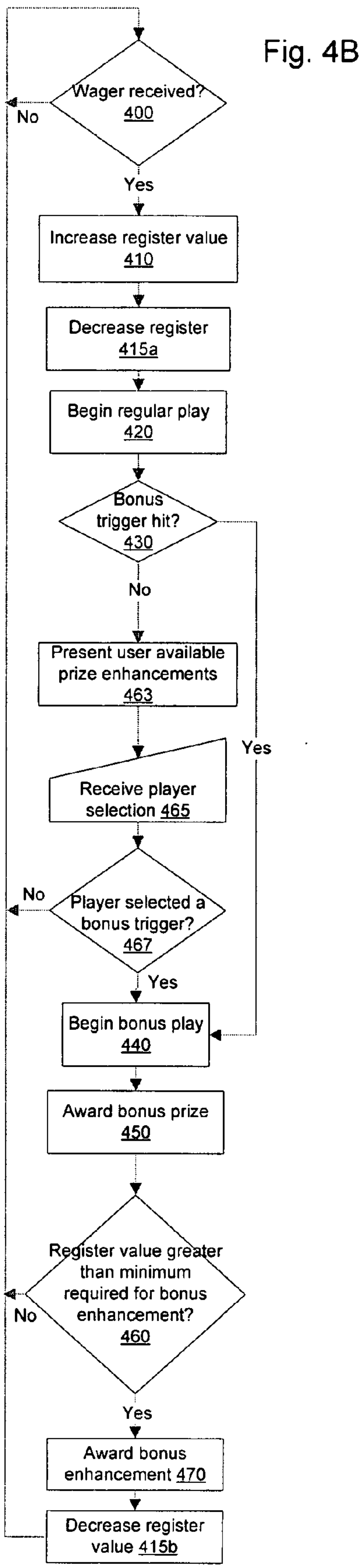
FIG. 4B illustrates a flowchart for an alternative example method, according to another example embodiment of the present invention.

FIG. 4B illustrates another example procedure where the player may have more control over the bonus awards. 400-430 are essentially the same as FIG. 4A. However, in the example procedure illustrated by FIG. 4B, if a bonus trigger is not hit, the procedure presents the user with the available prize enhancements 463. The player may then make an enhancement selection at 465. An example procedure may constantly present the user with the available enhancements, and the player may be allowed to make a selection at any point in the procedure, but to illustrate one example procedure, these features are shown at 463 and 465. In one example procedure, the bonus enhancement is a bonus round trigger. Such that if a player has accumulated enough register value for this enhancement (e.g. a bonus trigger) to be available, and the bonus trigger did not occur on its own, the player may be allowed to "purchase" a bonus trigger with their accumulated register value at 467. If the player does not select the trigger, the procedure will return to waiting for a wager. If the player does select a bonus trigger, the procedure will begin a bonus play 440. It will be appreciated that in other example procedures the only way to trigger a bonus is by purchasing it (e.g., there is not a bonus trigger as part of the regular game). In other example procedures, the player will be able to purchase a bonus trigger in addition to a trigger that occurred at 430 as part of the regular play. In other example procedures, the enhancement may be bonus rounds, other bonus games, a number of credits, a progressive jackpot, or any number of other awards or enhancements the player may be able to purchase with register value.

As with all of the example procedures, it will be appreciated that in some embodiments an accumulation of register value may be lost when a player leaves a machine, may be left for the next player to take advantage of, or may be carried over with the player to another machine or the same machine at a later time (e.g., through a player reward card inserted in the machine before play).

Example embodiments of the present invention could easily be implemented in any number of wagering games. One example would be a slot machine. A slot machine may include a plurality of reels with different symbols on them (or may use virtual reels in the case of video slot machines). Every unique combination of the different symbols may be associated with an outcome. Each outcome may have a specific probability of occurring and each outcome may have a specific prize associated with it. A play may include the machine selecting a random outcome from within the probability guidelines and presenting that outcome on the screen. Different sets of symbols may provide different levels of awards. For example, five aces may be worth a larger prize than five queens.

Figure 5:
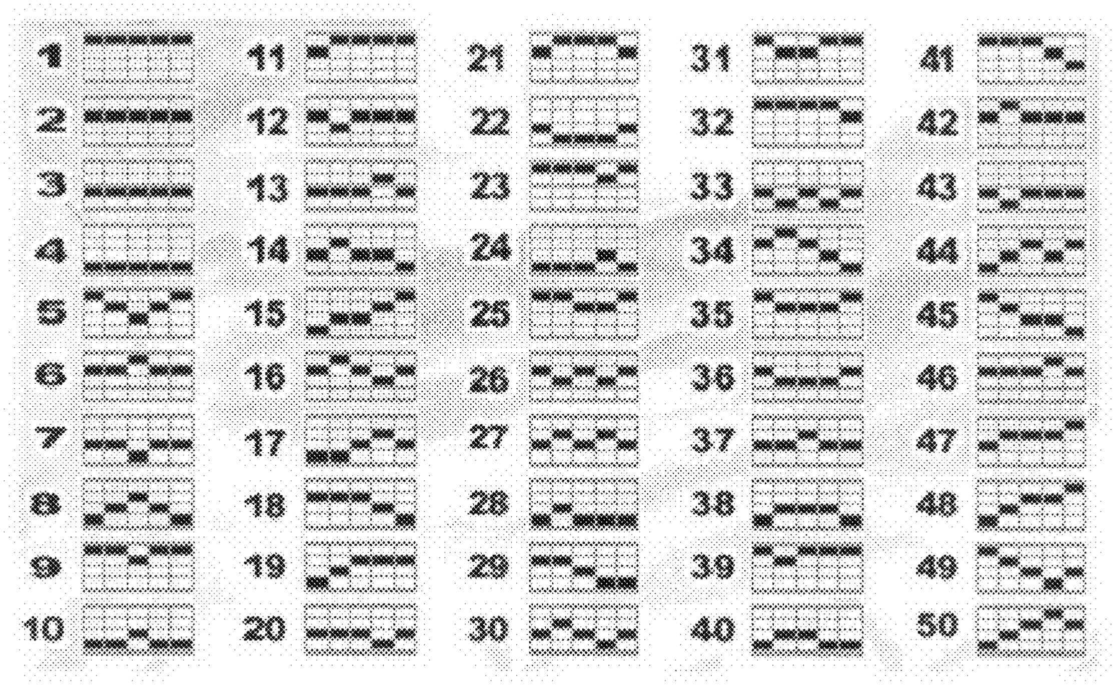
FIG. 5 illustrates an example feature of an example game, according to an example embodiment of the present invention.

Additionally, a slot machine may use "pay lines" to allow a player more control over the game. FIG. 5 illustrates fifty example pay lines. A player may have a per line wager of one credit and activate only line one. If the outcome randomly selected places the desirable symbols in the top row, then the player wins, but if the desirable symbols are in any other row, the player will have missed out on that prize. If, however, the player activated all four rows for four credits, then the player would win no matter what row the desirable symbols are found in. FIG. 5 illustrates fifty different patterns, each of which constitutes a pay line. The game may group the pay lines such that a player may only select which group of pay lines should be activated, or the game may allow the player to select each individual pay line. This way, if a play results in a winning combination of symbols (e.g., five aces or four aces and a wild card) and that combination is found in one of the active pay lines, then the player may win an associated prize.

One of the prizes a player may win is a bonus round. In that example procedure, the winning configuration may be considered a "bonus trigger." Maybe one of the symbols used is a "bonus" symbol and when five bonus symbols are found in an active pay line, a bonus is triggered. Alternatively, a bonus trigger may be implemented in other ways. In one embodiment, a bonus may be triggered when the outcome includes three special symbols found anywhere on the screen (regardless of what pay lines are active or if the three symbols fall in any pay line at all). This alternative embodiment is illustrated in FIG. 7B and will be discussed later.

Figure 6:
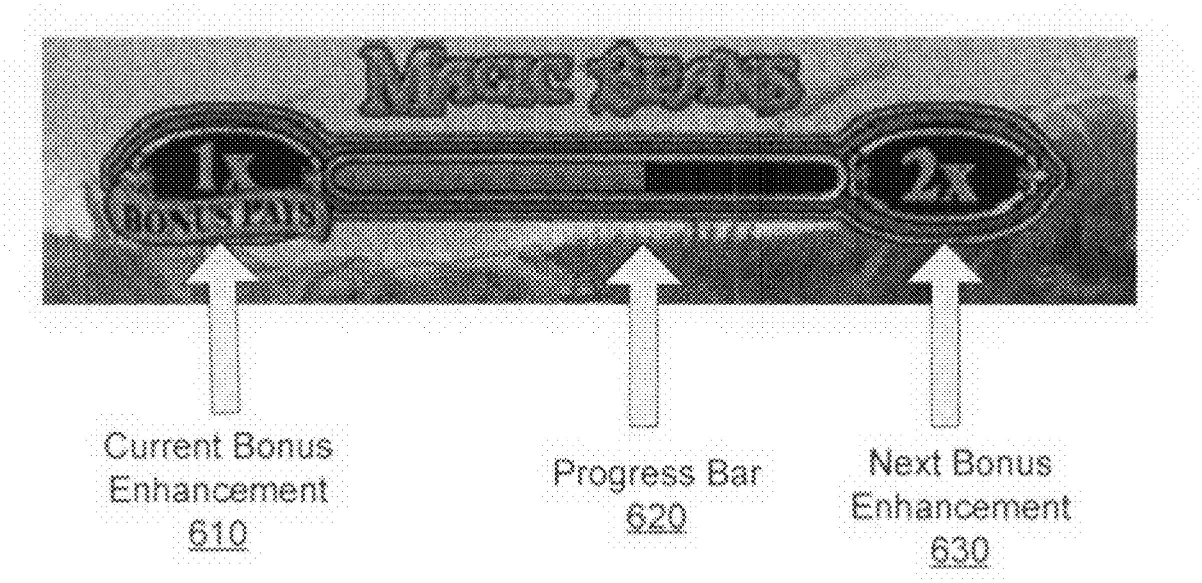
FIG. 6 illustrates an example implementation of a graphical progress feature according to an example embodiment of the present invention.

FIG. 6 illustrates another example feature of presenting to the player with the player's progress toward the next potential bonus round value. This could be presented any number of ways, but the example of FIG. 6 illustrates a progress bar between the current value and the next value. In FIG. 6, the current bonus award enhancement, should a bonus round be triggered, would be a 1× multiplier 610 (i.e. no added value). There is a progress bar 620 a little past the half way point to the 2× multiplier 630. When the progress bar reaches the 2× side, this may correspond to a register value in the 2× range. The 1× value on the left may then be replaced with the 2× value, the 2× value on the right may be replaced with the next potential bonus round prize enhancer (presumably but not necessarily a 3×), and the progress bar may be reset. Many other helpful pieces of information could be displayed to the player. For example, the rate of register value increase may be displayed. The number of wagers at the current level needed to achieve the next award could be displayed. The illustration of FIG. 6 is only one example.

Figure 7A:
FIG. 7A illustrates an example game, according to an example embodiment of the present invention.

FIG. 7A is an illustration of an example wagering game. In this embodiment, the game depicted in FIG. 7A is a regular play game 700. The example game may include a credit bank 710. When a player deposits money, it may be converted into credits. The player may then choose to wager some of those credits. The amount the player has selected to wager is indicated by the current wager box 720. This amount may be an irrevocable wager or may merely demonstrate what will be the irrevocable wager once some other input is entered (e.g., a spin button). If the game results in a prize, the amount won may be indicated in box 730. The example feature described in FIG. 6 is also visible at the top of the regular game 700. The example regular play includes five columns and four rows which may correspond to the five columns and four rows illustrated in FIG. 5. Additionally, the example regular play has fifty pay line indicators 735 to show which pay lines are currently active. Those pay lines may correspond to the pay lines illustrated in FIG. 5.

Figure 7B:
FIG. 7B illustrates an example bonus trigger, according to an example embodiment of the present invention.
Figure 7C:
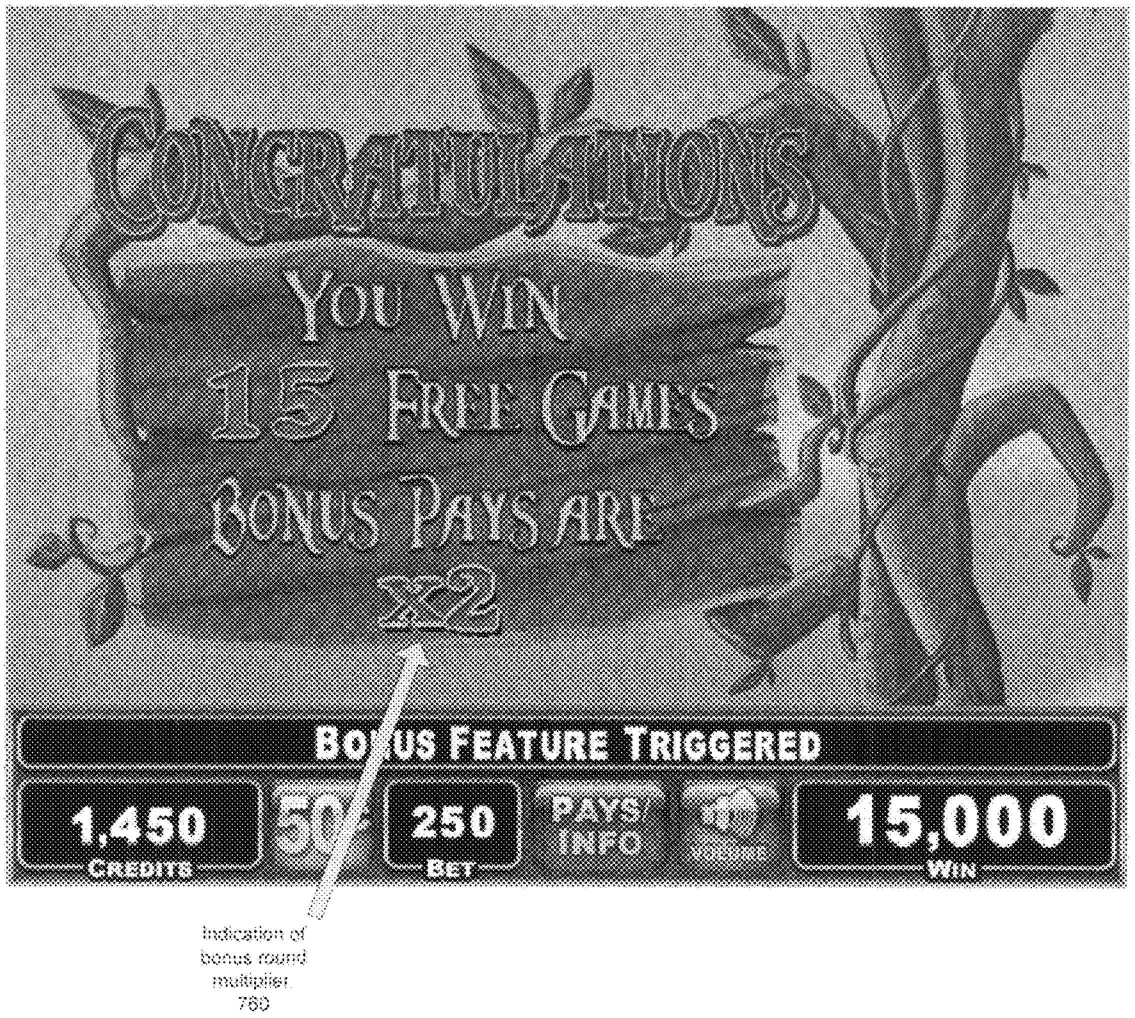
FIG. 7C illustrates an example bonus trigger, according to an example embodiment of the present invention.
Figure 7D:
FIG. 7D illustrates an example bonus game, according to an example embodiment of the present invention.
Figure 7E:
FIG. 7E illustrates an example prize announcement page, according to an example embodiment of the present invention.

FIG. 7B is an illustration of an example bonus trigger. In this embodiment, a bonus round is triggered whenever the outcome includes the presentation of three special symbols. Bonus round trigger 750 indicates the presence of the three symbols in this example. Message bar 740 then indicates that a bonus round has been triggered. In this example, the bonus round includes fifteen free games. FIG. 7C is an example screen announcing the bonus feature to the player. There is also an indication of a bonus multiplier 760. As indicated, the player will next receive fifteen free spins and the awards of those free spins will be multiplied by 2, the current bonus round multiplier. FIG. 7D illustrates free spin 12 of 15. In this example, there continues to be an indication of the bonus multiplier being used 760. At the conclusion of the bonus round, the player may be told how much was awarded during the bonus play. An example of this is illustrated in FIG. 7E. At the conclusion of the bonus round, the procedure may return to waiting for a player to make a regular play wager as illustrated in FIG. 7A.

It will be appreciated that all of the disclosed methods, games, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods, games, and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

What is claimed is:

1. A computer-implemented method of facilitating the play of a wagering game with a bonus game comprising:

maintaining a computerized register in an electronic storage device;

receiving at least one wager from a player during a regular play session;

in response to receiving the wager, increasing the value of the register with a computer processor, wherein the amount the register is increased after each regular play depends on the amount wagered during that regular play;

decreasing the value of the register responsive to receiving a wager, wherein the amount the register is decreased after each wager depends on the current value of the register;

in response to receiving the wager, providing a regular play;

during a regular play, providing a bonus play trigger;

responsive to the occurrence of the bonus play trigger, providing a bonus play;

as part of the bonus play, awarding a bonus play prize, the value of the bonus play prize depending at least in part on the value of the register.

2. The method of claim 1, further comprising: determining the value of the bonus play prize by multiplying a base value by a multiplier which depends on the current value of the register.

3. The method of claim 2, further comprising:

displaying the multiplier to the player during the regular play session.

4. The method of claim 1, further comprising:

as part of the bonus play, providing a number of additional bonus play rounds, the number of additional bonus play rounds depending on the current value of the register.

5. The method of claim 4, further comprising:

displaying the number of additional bonus play rounds to the player during the regular play session.

6. The method of claim 1, further comprising:

displaying to the player a visual indication of the total wager amount needed to increase the value of the bonus play prize enhancement that will be awarded if the bonus play is triggered.

7. The method of claim 1, further comprising:

responsive to the completion of the bonus play, decreasing the register value.

8. A non-transitory computer-readable storage medium encoded with instructions configured to be executed by a processor, the instructions which, when executed by the processor, cause the performance of a method comprising the steps of:

maintaining a computerized register in an electronic storage device;

receiving at least one wager from a player during a regular play session;

in response to receiving the wager, increasing the value of the register with a processor, wherein the amount the register is increased after each regular play depends on the amount wagered during that regular play;

decreasing the value of the register responsive to receiving a wager, wherein the amount the register is decreased after each wager depends on the current value of the register;

in response to receiving the wager, providing a regular play;

during a regular play, providing a bonus play trigger;

responsive to the occurrence of the bonus play trigger, providing a bonus play;

as part of the bonus play, awarding a bonus play prize, the value of the bonus play prize depending at least in part on the value of the register.

9. A gaming system, comprising:

a display;

a processor in communication with the display and configured to cause the display to display a regular play session for a wagering game;

a register accessible to the processor;

an input device configured to receive a wager amount from a player;

the processor further configured to receive information from the input device indicating the wager amount and to increase the value of the register based on the wager amount;

the processor further configured to decrease the register value in an amount dependent on the current register value;

the processor further configured to cause the display to display a bonus trigger during a regular play, the processor further configured to cause the display to display a bonus play responsive to the bonus trigger, the processor further configured to award a bonus play prize as part of the bonus play, the bonus play prize based at least in part on the value of the register.

10. The system of claim 9, where the processor is further configured to decrease the register value responsive to a wager.

11. The system of claim 9, where the processor is further configured to decrease the register value responsive to each bonus play.

12. The system of claim 9, where the processor is configured to determine the additional bonus play prize by multiplying the first bonus play prize by a multiplier whose value depends on the value of the register.

13. The system of claim 12, where the processor is further configured to cause the display to display during a regular play the current value of the bonus play prize multiplier.

14. The system of claim 9, where the processor is further configured to provide additional bonus play rounds as the bonus play prize enhancement, where the number of additional bonus rounds depends on the value of the register.

15. The system of claim 14, where the processor is further configured to cause the display to display during a regular play the number of additional bonus play rounds that would be provided if a bonus play were triggered.

16. The system of claim 9, where the processor is further configured to cause the display to display a visual indication during a regular play of the total wager amount needed to increase the value of the bonus play prize enhancement that will be awarded if the bonus play were triggered.

17. A computer-implemented method of facilitating the play of a wagering game with a bonus game comprising:

maintaining a computerized register in an electronic storage device;

receiving a wager from a player during a regular play session;

in response to receiving the wager, increasing the value of the register with a computer processor and providing a regular play;

during the regular play, providing a bonus play trigger;

responsive to the occurrence of the bonus play trigger, providing a bonus play;

as part of the bonus play, presenting a selection range for a bonus play prize to the player, the maximum amount of the selection range depending on a current value of the register;

receiving from the player an indication of the player's selection of a bonus play prize amount chosen from the selection range;

decrementing the register based on the indication received from the player; and responsive to a win occurring in the bonus play, awarding the bonus play prize that is based at least in part on the indication received from the player.

18. The method of claim 17, further comprising:

a server linking one or more devices which implement the method of claim 17; wherein maintaining a register includes maintaining a register for each player on the server such that any device the player places a wager at accesses the same register.

19. The method of claim 17, wherein the register is decreased based on the amount of the bonus play prize enhancement the player receives.

20. A non-transitory computer-readable storage medium encoded with instructions configured to be executed by a processor, the instructions which, when executed by the processor, cause the performance of a method comprising the steps of:

maintaining a computerized register in an electronic storage device;

receiving a wager from a player during a regular play session;

in response to receiving the wager, increasing the value of the register with a computer processor and providing a regular play;

during the regular play, providing a bonus play trigger;

responsive to the occurrence of the bonus play trigger, providing a bonus play;

as part of the bonus play, presenting a selection range for a bonus play prize to the player, the maximum amount of the selection range depending on a current value of the register;

receiving from the player an indication of the player's selection of a bonus play prize amount chosen from the selection range;

decrementing the register based on the indication received from the player; and responsive to a win occurring in the bonus play, awarding the bonus play prize that is based at least in part on the indication received from the player.

21. A computer-implemented method of facilitating the play of a wagering game with a bonus game comprising:

maintaining a computerized register in an electronic storage device;

receiving a wager from a player during a regular play session;

in response to receiving the wager, increasing the value of the register with a computer processor and providing a regular play;

responsive to the register being greater than or equal to a configurable minimum value, providing the player an option to select a prize enhancement; and decrementing the register based on the indication received from the player.

22. The method of claim 21, wherein the prize enhancement is the occurrence of a bonus trigger.

23. The method of claim 21, wherein the prize enhancement is a number of bonus spins.

24. A non-transitory computer-readable storage medium encoded with instructions configured to be executed by a processor, the instructions which, when executed by the processor, cause the performance of method comprising the steps of:

maintaining a computerized register in an electronic storage device;

receiving a wager from a player during a regular play session;

in response to receiving the wager, increasing the value of the register with a computer processor and providing a regular play;

responsive to the register being greater than or equal to a configurable minimum value, providing the player an option to select a prize enhancement; and decrementing the register based on the indication received from the player.

* * * * *